March 31, 1959     J. F. DUNN     2,879,690
PHOTOGRAPHIC EXPOSURE METERS
Filed March 25, 1955     3 Sheets-Sheet 1
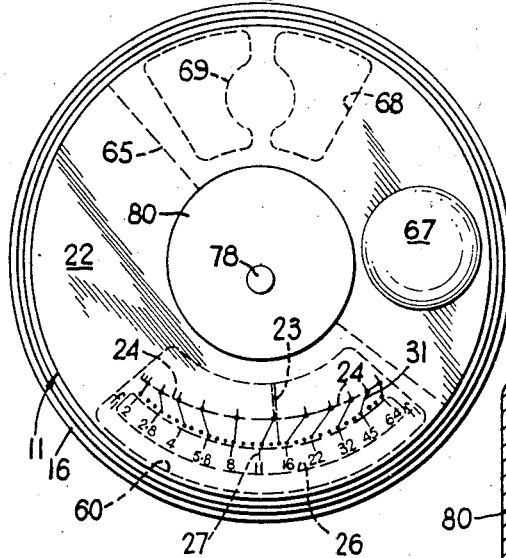
INVENTOR
JOHN FREDERICK DUNN
BY Rudolph Hederick
ATTORNEY INVENTOR
JOHN FREDERICK DUNN
BY Rudolph Hjerrick
ATTORNEY March 31, 1959
J. F. DUNN
2,879,690
PHOTOGRAPHIC EXPOSURE METERS
Filed March 25, 1955
3 Sheets-Sheet 3
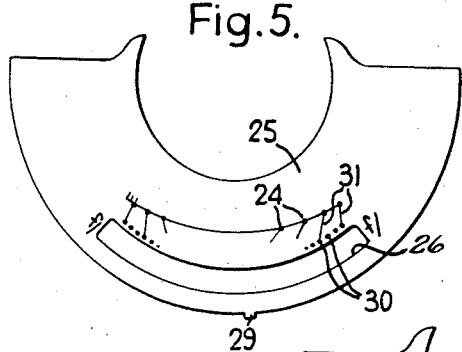
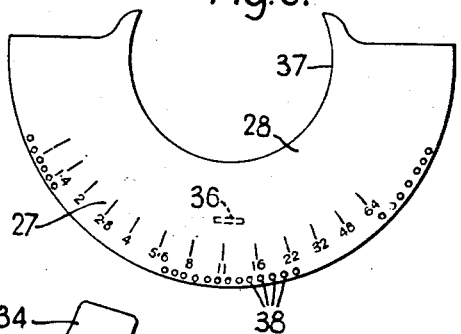
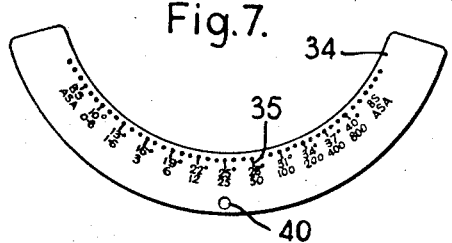
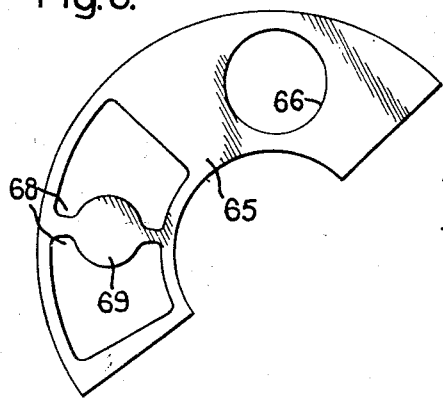
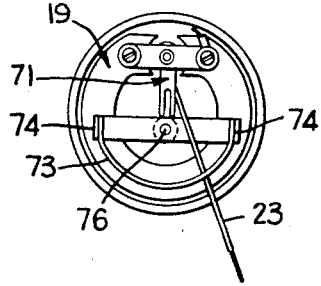
INVENTOR
JOHN FREDERICK DUNN
BY Rudolph Hurick
ATTORNEY

United States Patent Office

2,879,690

PHOTOGRAPHIC EXPOSURE METERS

John Frederick Dunn, Bramhall, England, assignor, by mesne assignments, to Daystrom, Incorporated, Murray Hill, N.J., a corporation of New Jersey Application March 25, 1955, Serial No. 496,870

10 Claims. (Cl. 88—23)

This invention relates to photographic exposure meters of the kind comprising a body adapted to be held in the hand, said body being provided with a photo-electric cell, an electrical galvanometer which is connected to be energised by the current output from said cell and has a pointer responsive to said cell output and a manually adjustable slide-rule device for use in combining various parameters, such as emulsion speed, diaphragm stops and shutter speeds in order to ascertain the proper exposure conditions by or from the galvanometer reading, as an improvement over that of application Serial No. 490,643, filed February 25, 1955, and having common ownership.

It is an object of the invention to provide an improved construction and arrangement of an exposure meter, e.g. of the combined incident-light and integrated-subject-luminance type, so devised as to be completely self-contained and also particularly convenient and quick in use for a wide range of applications and types of subject.

According to the invention an exposure meter of the kind referred to has an arcuate movable scale member which extends alongside the track of the galvanometer pointer and is adjustable longitudinally so as to present a predetermined series of scale markings to said pointer, depending upon the presetting of the slide-rule device. Thus the galvanometer pointer can conveniently read in units having a direct reference to the required exposure conditions, e.g. in diaphragm stops for a predetermined shutter setting and given emulsion speed or in shutter speeds for a predetermined diaphragm stop and emulsion speed.

In a preferred arrangement the body is shaped somewhat like a flat plate with alternative light receiving windows, photo-cell and galvanometer pointer exposed on the front face and the presettable slide-rule scales exposed on the rear face. Such an arrangement allows arcuate scales of relatively large radius and having large and clear figuring to be employed and also permits the back-to-front thickness of the device to be made of small dimension. The last mentioned advantage, coupled with the frontal placing of both the incident-light window and the final exposure indicating scale allows the incident light collector to be placed in substantially the same plane as the principal surface to be photographed thus also making the meter very suitable for continuous tone or line copying work or motion picture titling and similar work where the distance of the object from the illuminating means is usually relatively short and the placing of the light collector with relation to the plane of the surface to be photographed rendered critical.

In order that the above and other features of the invention may be more readily understood constructional forms of devices embodying the invention will now be described in greater detail with reference to the accompanying drawings in which:

Fig. 1 is a front elevation of one form of exposure meter according to the invention.

Fig. 2 is a rear elevation of the same exposure meter.

Fig. 4 is an enlarged transverse cross-section taken on the line IV—IV of Fig. 3.

Fig. 5 is a view of the front face of the galvanometer scale plate.

Fig. 6 is a view of the front face of the movable slide-rule scale member.

Fig. 7 is a view of the rear face of the fixed slide-rule scale member.

Fig. 8 is a detail view of an opaque apertured mask carried by the front casing part.

Fig. 9 is a fragmentary detail view showing the pointer clamping mechanism.

Figure 3:
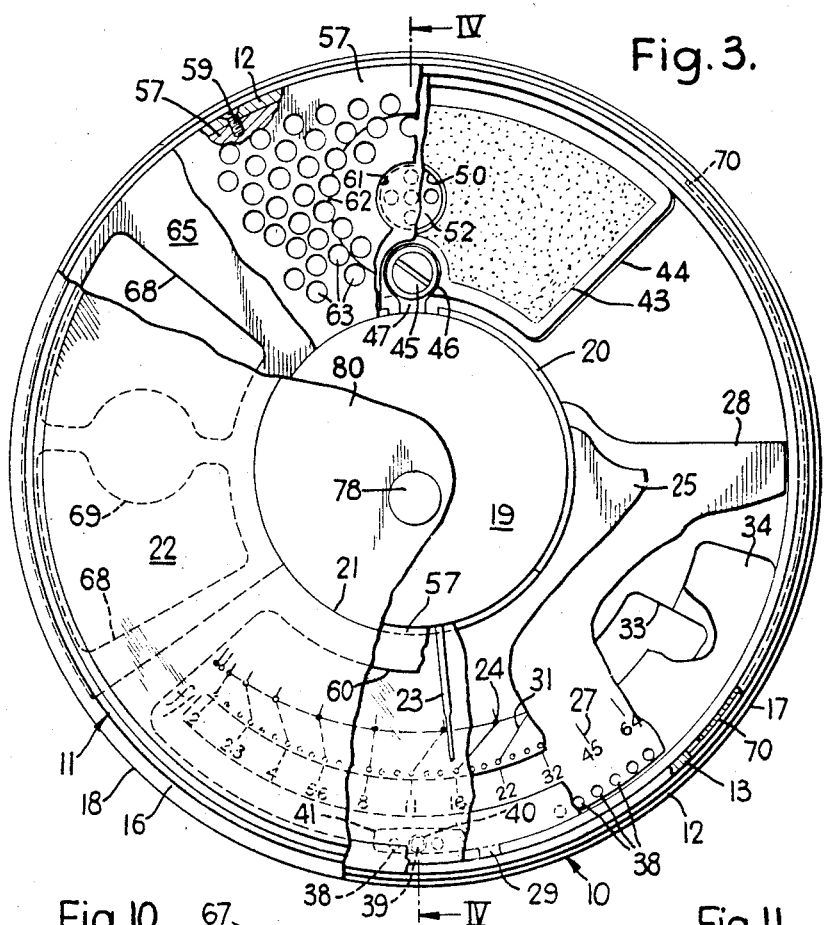
Fig. 3 is a front elevational view largely in section and with various parts broken away in order better to show the internal construction.

Referring first to Figs. 1 to 8 of the drawings, the meter body is shaped substantially as a thin circular flat plate having a thickness (approximately ½ inch) many times less than its width or diameter (approximately 4 inches) and comprises a dish-shaped rear casing part 10 which may be made of metal, e.g. aluminum or, alternatively, of insulating material, e.g. Bakelite or a similar thermoplastic material, and a front casing part or lid 11. The rim 12 of the rear casing part 10 is reduced in diameter over region 13 to form a bearing surface for the rearwardly directed flange 15 of a metal rim or bezel 16 of the front casing part whereby the latter is rotatable with respect to the rear casing part. Knurled regions 17, 18 on the two casing parts facilitate the relative movement of the parts.

An electrical galvanometer or movement 19, e.g. a sensitive moving-coil instrument, is rigidly secured to the front surface of the rear casing part 10 by the entry of its rearward end into a central tubular wall or spigot 20 integral with casing part 10. The forward end of the movement 19 projects through a snug-fitting circular aperture 21 in a transparent front wall 22 of the front casing part 11 secured in the bezel 16. The indicating pointer 23 of the galvanometer movement 19 projects outwardly through a gapped region of the spigot 20 for co-operation with an arcuate fixed meter scale 24 constituted by a series of markings upon a fixed galvanometer scale plate 25 secured in the rear casing part 10. This scale plate 25 (shown more clearly in Fig. 5) is provided with an arcuate slot 26 extending alongside and just outside the scale markings 24 for exposing a series of scale markings 27 related to diaphragm apertures and carried on the front face of a movable scale member in the form of an arcuate plate 28 (shown more clearly in Fig. 6). An outwardly directed lug 29 on plate 25 enters a corresponding notch in the rim 12 to secure this plate against angular movement.

The scale 24 is calibrated in geometric progression according to the light intensity effective upon the photo-cell and takes into account any irregularities in the combined characteristics of the cell and the galvanometer movement. The scale markings 27 co-operate with a light scale constituted by a series of equi-spaced markings 30 extending along the inner edge of slot 26, such markings being coupled by lines or bands 31 to the related points on the meter scale 24 so that for any position of the movable scale member 28 a reading of the appropriate diaphragm stop for any given pointer position can readily be ascertained by following the appropriate line or band.

The rear surface of the movable scale plate 28 is provided with a second set or scale of indicating markings 32 (Fig. 2) which are related to shutter speeds and are exposed rearwardly through an arcuate opening 33 in the rear wall of the rear casing part 10. A further fixed slide-rule scale plate 34 (see Fig. 7) having an inner radius greater than that of the smaller radius wall of the rear arcuate opening 33 is positioned between the rear surface of the movable scale plate 28 and the rear wall of the rear casing part 10 and carries on its exposed rearward face a further series or scale of indication markings 35 related to emulsion speeds for co-operation with the scale of shutter speeds 32 on the rear face of the movable scale plate 28.

The movable scale plate 28 is provided with a central part-circular opening 37 fitting around the outer surface of the spigot 20 and has a rearwardly projecting finger 36 rigidly secured thereto. This finger 36 is positioned to lie closely adjacent to the smaller radius wall of the arcuate rear opening 33 and permits manual adjustment of the angular position of such movable scale plate. In order that the adjustment movement of the movable scale plate may take place in definite equi-angular steps corresponding with the scale divisions or sub-divisions of the emulsion scale 35 such plate is provided with a circumferential series of equi-spaced dimples or holes 38 (Figs. 4 and 6) adjacent its outer edge for co-operation with a locator ball 39 which is housed within a circular aperture 40 in the fixed scale plate 34, such ball 39 being resiliently urged in a forward direction by means of a bowed blade spring 41 located within a shallow recess in the front surface of the rear wall of the rear casing part 10.

At a position in the meter body diametrically opposite that occupied by the slide-rule arrangements of fixed and moving scale plates 28 and 34, there is located a photo-electric cell 43 in the form of a thin sector-shaped plate disposed within a correspondingly shaped shallow recess 44 in the front surface of the rear wall of the rear casing part 10. This photo-cell 43 is secured in position and the requisite electrical connections also made thereto by means of screw 45 entering a tapped hole in the wall of the rear casing part. This screw co-operates with a flanged insulating washer 46 to clamp a connecting tag 47 in contact with the front electrode surface of the cell and to clamp the rear electrode surface of the cell in contact with the casing part 10.

The electrical connections between the photo-cell 43 and the galvanometer movement 19 are completed by way of the casing part 10 to the main body of the galvanometer when the part 10 is of metal and by way of a bridge wire 48 to insulated terminal 49 of such galvanometer. If the casing part 10 is of insulating material, an additional thin metal plate is provided between the rear face of the photo-cell and casing part 10 and this extends into contact with the main body of the galvanometer.

The photo-cell 43 is provided with a central circular aperture 50 therethrough in alignment with a similar aperture 51 in the rear wall of the rear casing part 10. A mask plate 52 containing a predetermined number of small diameter perforations and an imperforate transparent film 53 are located within a further shallow recess in the rear wall of the rear casing part 10 to span the aligned apertures 50, 51 for the purpose of determining the amount of rearward or "back-leak" light capable of passing forwardly through such apertures.

A close fitting annulus 55 of transparent material, seated on a landing 56 around the inner wall surface of the rim 12, forms a dust-excluding partition in front of the various scale plates and behind the pointer 19. This annulus 55 is held clamped in position by an inner opaque lid or clamping member 57 provided with a radially directed flange 58 which sits on the forward edge of the rim 12 of the rear casing part 10, such member 57 being held in position by a plurality of radially directed securing screws of which one is shown at 59 in Fig. 3. This member 57 is provided with an arcuate window opening 60 through which the galvanometer pointer 23 and its co-operating scales 24 and 27 are made visible while at a position lying diametrically opposite to opening the window such member is provided with an aperture 61 aligned with the apertures 50, 51 and formed at the rearward smaller diameter end of a conical hole 62. This aperture 61 is surrounded by a directional grille constituted by a plurality of closely spaced holes 63 whose axes lie normal to the plane of the photo-cell plate 43 for permitting a controlled amount of light to pass from the forward side of the member 57 on to the light sensitive surface of the photo-cell.

Secured to the rear face of the transparent wall 22 of the front casing part 11 is an opaque mask 65 (shown in detail in Fig. 8). Such mask has a circular aperture 66 therein at a radius from the centre of rotation of the front casing part 11 which is equal to the radius of the apertures 50, 51 from the centre of the back casing part 10 whereby the three apertures may be aligned by suitable adjustment of the front casing part. Coincident with this aperture 66 the transparent front wall 22 carries a translucent domed window member 67 the inner surface of which is preferably of polished character. This constitutes the light window for "incident-light" type operation. A further apertured region 68 in the mask 65 can be brought into register with the grille of holes 63 by suitable adjustment of the front casing member 11. This constitutes the light window for operation under "integrated-subject luminance" conditions. A circular central mask portion 69 obscures the major portion of the conical hole 62 in member 57. The front casing member is arranged to be rotatable through an angle of approximately 90° between two limit positions in which one or other of such alternative light windows is in alignment with the photo-cell. Such limit positions are defined by the engagement of an inwardly directed radial stud (not shown) carried upon the inner surface of the flange 15 with the ends of a shallow peripheral slot 70 in the outer surface of the rim 12.

The galvanometer movement 19 is provided with a conventional type of zero adjuster means 71 including a forked arm which is engaged by the eccentrically disposed pin of a rotatable zero adjuster plug 72 carried in the centre of the rear wall of the rear casing part 10. Provision is also made for clamping the meter pointer 23 at all times except when a reading is being made in order to facilitate operation and to prevent accidental damage during transit. These pointer clamping arrangements (Figs. 4 and 9) comprise an arcuate clamping wire 73 secured at its opposite ends to the rearwardly directed lugs 74 of a U-shaped bridge 75 carried on the rearward end of an operating rod 76 which passes forwardly through a slide barrel 77 secured to the meter body and terminates in a push-button 78 projecting forwardly through the front of the meter casing. A helical spring 79 trapped in barrel 77 serves normally to urge the push-button 78 and the interconnected bridge piece 75 in a forward direction whereby the arcuate clamp wire 73 engages and clamps the meter pointer 23 but permits the depression of such push knob to free the meter pointer when a reading is required to be made. A cylindrical cover plate 80 with a closed forward end wall fits over the outer surface of the forward end of the meter casing to protect the latter.

In the operation of the exposure meter embodiment just described, the front casing part 11 is first adjusted to bring either the domed window 67 or the mask aperture 68 into register with the photo-cell 43 according to whether the exposure meter is required to operate under "incident-light" or "integrated-subject-luminance" conditions. The slide rule device is then adjusted, normally by manipulating the movable scale plate 28 by means of finger 36 to bring the required shutter speed marking into register with the particular emulsion speed of the photo-sensitive material being used in the associated camera or the like. The meter is then held or placed in the appropriate position for effecting measurement and the pointer release button 78 depressed. The current output from the photo-cell 43 operates the galvanometer movement 19 to move the pointer to the relevant indicating position. The button 78 is now released to clamp the pointer 23 in its indicating position whereupon the appropriate diaphragm stop for use can be read off by inspecting meter scale 24 and determining the related diaphragm stop from the scale 27 through the appropriate coupling line 31. Alternatively it is possible to determine the appropriate shutter speed for a given diaphragm stop and emulsion speed by first obtaining a reading on the galvanometer pointer by unclamping and reclamping the same by operation of the press button 78 and then adjusting the movable scale plate 28 to bring the chosen diaphragm stop marking into appropriate relationship to the pointer indication whereafter the required shutter speed for the particular emulsion speed in use can be determined by reference to the related scales exposed on the back of the meter. Automatic correction for back lighting is obtainable when required by positioning the exposure meter to allow back lighting to pass through the apertures 51 and 50 on to the inner surface of the domed window 67 whence by reflection it becomes effective upon the light-sensitive surface of the photo-cell 43.

Figure 10:
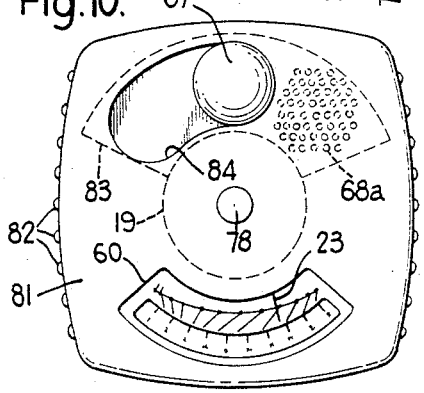
Figs. 10 and 11 show, in front and side elevation respectively, a modified form of device according to the invention.
Figure 11:
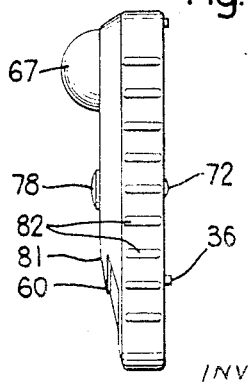

The invention is not limited to the particular constructional arrangements described and shown and in particular is not limited to the circular profile. Figs. 10 and 11 show a modification in which the casing 81 is of substantially rectangular shape conveniently provided with a plurality of side ribs 82 to facilitate handling. The galvanometer movement, in this example, is of reduced axial thickness thereby avoiding the provision of a forwardly projecting central region while the alternative light admission windows constituted by a dome 67 and an apertured mask region 68a are mounted on an internal rotatable mask plate 83 cooperating with an arcuate slot 84 in the front wall of the casing.

Various other modifications can obviously be made without departing from the scope of the invention. Thus the arrangement of the various scales of the slide rule device can be changed in any desired manner. The directional grille constituted by the plurality of holes 63 may be replaced or supplemented by a window structure of lenticular form. The domed window member 67 may be of different size and/or form. The entry of "back-leak" light through rear aperture 51 may be controlled according to the angle of incidence of such back lighting by fitting to such aperture an inverted cone of translucent material pointing inwards. If desired the exposure meter may include a de-sensitising device for increasing its operating range and comprising obstructing means for reducing the exposed light-sensitive area of the photo-cell mechanically coupled to the slide rule device whereby the readings of the latter are appropriately altered. Such de-sensitising arrangement can comprise the arrangement of the scale plate 34 of the slide rule device to be movable longitudinally in a manner similar to the movable plate 28. Such movable scale plate 34 is provided with an extension carrying a masking member adapted to obscure part of the area of the photo-cell 43. Due to the movability of such scale plate 34 the relationship between the various parameter markings is changed appropriately to provide alternative operating conditions, one, a "high-sensitivity" position in which the whole of the available photo-cell area is exposed to illumination and the second a "low-sensitivity" position in which only a proportion of such area is exposed.

I claim:

1. An exposure meter comprising a rear dish-shaped casing part having a forwardly-extending cylindrical rim, a front casing part with a transparent front wall and a rearwardly-directed cylindrical flange, the rim of the rear casing part having a portion of reduced diameter to form a bearing surface for said rearwardly-directed flange, whereby said front casing part is rotatable with respect to the rear casing part to position to use a selected window for admitting light to the meter, said rear casing part having a central forwardly-extending tubular wall, an electrical galvanometer rigidly secured to the front surface of said rear casing part by reception in said tubular wall, the forward end of said galvanometer being snugly received in a circular aperture in said transparent front wall of the front casing part, an arcuate forwardly-facing meter scale secured to the rear casing part, an indicating pointer projecting outwardly from said galvanometer through a gapped region of said tubular wall for cooperation with said scale, a rearwardly-facing manually adjustable slide rule device for use in combining various parameters affecting the exposure, an apertured photo-electric cell disposed laterally of said meter movement and enclosed by said front and rear casing parts, said cell and pointer being exposable at the front of said meter, said slide rule device including an arcuate movable scale member which extends alongside the track of the galvanometer pointer and is adjustable longitudinally so as to present a predetermined series of scale markings to said pointer depending on a presetting of said slide rule device, and scales of said slide rule device exposable at the rear face of said meter.

2. An exposure meter according to claim 1 in which the scale extending alongside the galvanometer pointer is calibrated in terms of diaphragm stops and the slide-rule device scales on the rear face of the device in terms of shutter speeds and emulsion speeds.

3. An exposure meter according to claim 1 in which alternative light receiving windows are provided for use respectively under incident-light and integrated-subject-luminance type operating conditions.

4. An exposure meter according to claim 3 in which the light receiving window for use under incident light type operating conditions comprises a translucent dome projecting forwardly beyond the front face of the body.

5. An exposure meter according to claim 1 which includes means for clamping the pointer of said galvanometer in any position throughout its range of operative movement.

6. An exposure meter according to claim 5 wherein said clamping means are arranged normally to be spring urged into the condition operative to clamp said pointer and releasable to unclamp said pointer by manual pressure upon a control member.

7. An exposure meter according to claim 5, wherein said clamping means are arranged normally to be spring urged into a condition operative to clamp said pointer, and a clamp release control member comprising a pushbutton on the front face of said body.

8. An exposure meter according to claim 1 which includes means for providing alternative ranges of light sensitivity and comprising means for masking part of the light sensitive region of the photo-cell mechanically interconnected with a movable scale member of said slide-rule device.

9. An exposure meter comprising a body, a photoelectric cell therein, an electrical galvanometer connected to be energized by the current output from said cell and having a pointer, said photo-electric cell and galvanometer pointer being exposable at the front face of the meter, alternate light receiving windows for said cell for use respectively under incident light and integrated-subject-luminance type operating conditions, that for use under incident light type operating conditions comprising a translucent dome projecting from the body, and means for introducing correction for back-lighting by admission of light to the inner surface of said dome from the back face of the device through an aperture in the photo-cell.

10. An exposure meter comprising a body adapted to be held in the hand and a photo-electric cell in said body, an electrical galvanometer connected to be energized by the current output from said cell and having a pointer responsive thereto, a manually-adjustable slide rule device for use in combining various parameters affecting the exposure, said photo-electric cell and galvanometer pointer being exposable at the front face of the meter, said slide rule device including an arcuate movable scale member which extends alongside the track of the galvanometer pointer and is adjustable longitudinally so as to present a predetermined series of scale markings to said pointer depending on a presetting of said slide rule device, scales on said slide rule device exposable at the rear face of said meter, alternate light receiving windows for use respectively under incident light and integrated-subject-luminance type operating conditions, the light receiving window for use under incident light operating conditions comprising a translucent dome projecting forwardly beyond the front face of the body, and means for introducing a correction for back-lighting by the admission of light from the back face of the device through an aperture in the photo-cell onto the inner surface of said dome.

References Cited in the file of this patent

UNITED STATES PATENTS

| Number | Name | Date |
|---|---|---|
| 2,092,826 | Bernhard et al. | Sept. 14, 1937 |
| 2,147,999 | Tonnies | Feb. 21, 1939 |
| 2,274,441 | Williams | Feb. 24, 1942 |
| 2,363,796 | Lamb | Nov. 28, 1944 |
| 2,389,617 | Freund | Nov. 27, 1945 |
| 2,408,944 | Miller | Oct. 8, 1946 |
| 2,481,678 | Mihaly | Sept. 13, 1949 |
| 2,503,768 | Riszdorfer | Apr. 11, 1950 |
| 2,528,716 | Williams et al. | Nov. 7, 1950 |
| 2,529,337 | Hickok | Nov. 7, 1950 |
| 2,532,417 | Norman | Dec. 5, 1950 |
| 2,579,661 | Freund | Dec. 25, 1951 |
| 2,584,440 | Fogle | Feb. 5, 1952 |
| 2,628,527 | Rifkin | Feb. 17, 1953 |
| 2,694,956 | Rebekoff | Nov. 23, 1954 |